United States Patent Office 3,327,170
Patented June 20, 1967

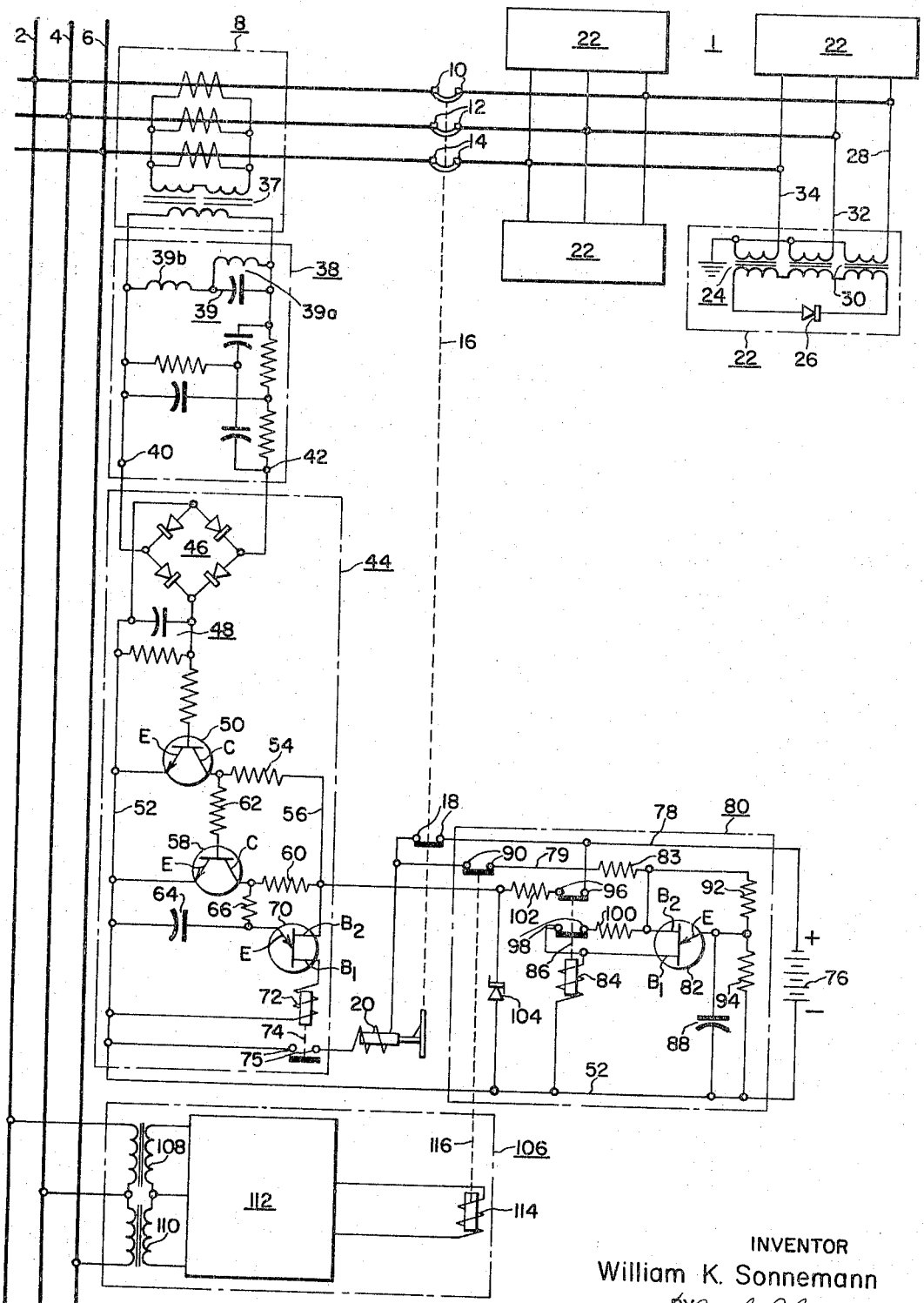

3,327,170
BROKEN CONDUCTOR SENSING DEVICE
William K. Sonnemann, Roselle Park, N.J., assignor to Westinghouse Electric Corporation, East Pittsburgh, Pa., a corporation of Pennsylvania
Filed Oct. 21, 1963, Ser. No. 317,747
23 Claims. (Cl. 317—27)

This invention relates generally to the protection of electrical network distribution systems and more particularly to the providing, in such a system, of means for deenergizing a portion thereof in the event of the breaking of a conductor.

In electrical distribution systems especially those of the aerial type it sometimes happens that a high voltage conductor or distribution wire breaks and falls to the ground. If this occurs on dry ground or on concrete, the fault resistance may be sufficiently high so that the fault current flowing between the conductor and ground is insufficient to be sensed by conventional relaying apparatus. This would be particularly true in the event that the fault occurred when the load on the circuit was otherwise small.

An object of this invention is to provide an improved relaying apparatus which will respond to the existence of a broken conductor so that the distribution circuit having such broken conductor may be deenergized before damage is caused thereby which damage, of course, may be the electrocution of a person, the starting of a fire or other damage which might occur by reasons of the breaking and faulting of the conductor.

Another object of this invention is to provide such an apparatus which will cause a second harmonic current to flow in the faulted distribution circuit in the event of the breaking of a distribution circuit conductor.

Another object of this invention is to provide such a system which will not respond to the second harmonic current which flows due to operation of the distribution circuit other than that caused by a broken conductor.

Other objects will be apparent from the specification, the appended claims and the drawings, in which the sole figure thereof illustrates a portion of an electrical distributing network embodying the invention.

Referring to the drawings by characters of reference the numeral 1 indicates generally a distribution circuit energized from power supply buses 2, 4 and 6 through a current transformer array 8 and contacts 10, 12 and 14 of a circuit breaker or interrupter 16 having auxiliary control contacts 18 and a trip winding 20. As is usual the distribution circuit 1 has a number of branches, four being illustrated herein, terminating at a second harmonic generator generally designated 22. As illustrated, the branches do not show the load connections thereto but are intended to represent the usual commercial branches of a power distribution system.

The harmonic generators 22 are alike and each comprises a three phase transformer arrangement 24 which may take many forms but which is illustrated as comprising three single phase transformers each having a primary and a secondary winding. The primary windings of the transformers are connected together in Y with one terminal of each thereof connected to ground and the other terminals individually connected to the three conductors 28, 32 and 34 of the distribution circuit 1. The secondary windings of the transformers are connected together in delta. A diode or other asymmetric current conducting device 26 is series connected in the delta as shown.

As long as all of the conductors 28, 32 and 34 connected thereto form an unbroken circuit from the source no current circulates in the secondary of the transformer arrangement 24. If, however, one of the circuit conductors as for example the conductor 28 breaks, the transformer 30, connected between conductor 28 and the grounded neutral is no longer energized from the distribution circuit 1, current will circulate through the secondary windings of the transformer arrangement 24 in an endeavor to maintain the transformer 30 energized. If there is a load connected intermediate the transformer 30 and the break in the conductor 28 load current as well as magnetizing current will attempt to flow into the transformer 30 supplied by the secondary windings of the other two transformers.

Assuming for the instant that no load is connected intermediate the break and the transformer 30 solely magnetizing current will flow; however, because of the asymmetric device or diode 26 this secondary current will flow unidirectionally thereby drawing a second harmonic component through the unbroken conductors 32 and 34. Initially, the magnitude of this current is small but since the current flow in the secondary winding of the transformer 30 is unidirectional, the core of the transformer 30 soon saturates so that a substantial secondary current is caused to flow. This results in a current rich in second harmonics flowing to the transformer arrangement 24 through the conductors 32 and 34.

The current transformer array 8 includes a current transformer for each line conductor with the secondary windings connected in parallel to the primary winding of a transformer 37 of the mutual reactor type having a gap in its core whereby the output of its secondary winding is, in effect, a voltage proportional to the current input to its primary winding. The secondary winding of transformer 37 is connected through a filter network 38 and a time delay network 44 to the trip winding 20 of the circuit breaker 16. The network 38 may take any desired form so long as it will pass substantially only the second harmonic component of the frequency supplied by the buses 2, 4 and 6. Preferably the network includes a circuit 39 including a first tuned portion 39a comprising an inductance connected in parallel with a capacitor and a second portion comprising an inductance 39b series connected with the first tuned portion. The first portion 39a is tuned to the second harmonic component and circuit 39 is tuned in its entirety to pass the third harmonic component. The twin-T portion of the network 38 is completely described on page 270 of the handbook entitled, "Reference Data for Radio Engineers," 4th edition and published by International Telephone and Telegraph Corporation. The network 38 passes, to its output terminals 40 and 42, current of a narrow frequency band which includes the second harmonic component of the potential supplied thereto and shunts the fundamental and third harmonic components. Since most alternating current power systems in the United States operate at a frequency of 60 cycles per second, the network will shunt 60 and 180 cycle components and pass the 120 cycle component. The terminals 40 and 42 are normally deenergized but are energized as a consequence of the breaking of a conductor.

The network 44 interposes a time delay between the time that the second harmonic signal appears at the terminals 40 and 42 and the energization of the winding 20 to prevent false tripping of the breaker 16. This time delay network 44 comprises a full wave rectifying network 46 which energizes a resistor-capacitor network 48. A potential is thereby developed across the network 48 which is proportional to the magnitude of the output voltage of the filter 38. This voltage is applied between the base and emitter of an NPN type transistor 50 which has its emitter E connected directly to a negative potential supplying bus 52 and its collector C connected through a voltage dropping resistor 54 to the positive potential bus 56. The potential drop appearing across the transistor 50 is applied between the base and emitter of a second NPN type transistor 58 which like transistor 50 is connected between the buses 52 and 56 in series with a regulating resistor 60. A resistor 62 is connected in the base circuit of the transistor 58 in the usual manner. It will be apparent from the foregoing that the transistor 50 will conduct upon the occurrence of a second harmonic current in the distribution circuit 1. The transistor 58 is normally conducting and becomes non-conducting as a consequence of the conductions of the transistor 58. As transistor 50 becomes less conductive charging current flows to the capacitor 64 through the resistor 60 and the resistor 66 causing the potential across capacitor 64 to increase. The capacitor 64 is connected between the emitter E and base $B_1$ of a unijunction transistor 70 and fires the transistor 70 when the capacitor 64 receives a critical charge. The base $B_2$ of transistor 70 is connected to bus 56 and the base $B_1$ is connected through the energizing winding 72 of the relay 74. Therefore, when the transistor 70 fires, current will flow between the bus 52 and bus 56 causing the relay 74 to close its normally open contacts 75. The closure of these contacts 75 energizes the trip coil 20 of the breaker 16 through a circuit which extends from the positive terminal of the station battery 76, a bus 78, contacts 18 of the normally closed breaker 16, trip coil 20, contacts 75 of the relay 74 to bus 52 and therethrough back to the negative terminal of the station battery 76. When so energized the trip coil 20 releases the breaker 16 which thereupon opens its contacts 10, 12, 14 and 18 to deenergize the distribution circuit 1 and disconnect the trip coil 20 and the timer or delay network 80 from the station battery 76. Since the timer 80 controls the energization of the timer or delay network 44, this network 44 will also be disconnected from the station battery 76 and reset for a new timing operation.

The timing network 80 like the timing network 44 compirses a unijunctional transistor 82 having its bases $B_1$ and $B_2$ connected in series with the energizing winding 84 of a relay 86 through a resistor 83 between the buses 79 and 52. The bus 79 is connected to the station battery bus 78 through the contacts 18 of breaker 16 and contacts 90 of relay 116. A capacitor 88 is connected between the emitter E and base $B_1$ of the transistor 82 through the winding 84. When the charge on the capacitor 88 reaches a critical potential it will render the transistor 82 conductive to energize the relay 86. Resistors 83, 92 and 94 are connected in series with each other between the buses 79 and 52 and primarily control the time interval required for the capacitor 88 to attain its critical potential. When the capacitor 88 reaches its critical potential and the unijunctional transistor 82 conducts, current will flow through the winding 84 to close its contacts 96 and 98. Closure of the contacts 98 closes a holding circuit through the aforementioned resistor 83 and additional resistor 100 so that the winding 84 will be maintained energized as long as the contacts 18 and 90 remain closed irrespective of the conductive condition of the transistor 82.

Closure of the contacts 96 completes a circuit from the positive bus 78 to the positive bus 56 of the timing network 44 through a voltage regulating apparatus comprising a resistor 102 and a voltage regulating Zener diode 104. It will therefore be appreciated that each time that the circuit breaker 16 is opened and then reclosed the timing network 80 times out a preliminary delay interval which must elapse prior to energization of the positive bus 56 of the timing network 44. This preliminary delay interval delays the timing out of the normal delay interval of the network 44 so that transients caused by the energization, reenergization or a drop in voltage of the distribution circuit 1 and which may last longer than the normal delay interval are not effective to trip the circuit breaker 16.

The distribution circuit 1 will include a number of distribution transformers (not shown) supplying electrical energy to loads connected thereto. With such an arrangement upon initial closure of the contacts 10, 12 and 14 of the circuit breaker 16 second harmonic current may flow for periods of time depending upon the portion of the voltage wave that the network is reenergized. This is a perfectly normal operation of the system and means must therefore be provided to prevent this normal occurrence of the second harmonic current from actuating the trip coil 20 of the circuit breaker 16. For this purpose, the network 80 is reset each time the breaker 16 opens and must time out each time that the circuit breaker 16 is closed. Its timing interval must be at least as long as the time interval in which second harmonic current may be expected to flow in the distribution circuit 1 as a consequence of the reenergization of the inductive devices energized by the distribution circuit 1.

There is also another instance in which the second harmonic current might normally flow in the distribution circuit 1 without indicating a broken conductor. This is caused by a reduction in potential supplied to the distribution circuit 1 followed by a resumption of the normal potential. In order to prevent the control apparatus from responding to the second harmonic caused by this occurrence as against that caused by a broken conductor, the apparatus 106 is provided to cause the timing network 80 to time out similarly to that which occurs when the breaker 16 is closed.

The apparatus 106 includes two single phase input transformers 108 and 110 connected with the primary windings in open delta between the buses 2, 4 and 6 and their secondary windings in open delta for supplying the positive sequence network 112. An example of such a network may be found in my U.S. Patent No. 2,470,661. For the instant purposes it is necessary merely to provide a network connected to maintain the winding 114 of a relay 116 energized and its contacts 90 closed whenever the control component of the voltage in the buses 2, 4 and 6 remains above a predetermined value. If the voltage component falls below this value the network 112 is unable to maintain the winding 114 sufficiently energized and the relay 116 opens the contacts 90. Opening of the contacts 90 deenergizes the bus 79 causing deenergization of the relay 86 and deenergization of the bus 56 whereby the timing network 44 cannot respond to the occurrence of any second harmonic current in the distribution circuit 1.

When the control voltage component in the buses 2, 4 and 6 again reaches a predetermined critical minimum magnitude, the network 112 reenergizes the relay 116 to close its contacts 90 whereby the capacitor 88 will charge as set forth above in respect to the closure of the contacts 18 to render the transistor 82 conducting to energize the relay 86 for reenergization of the bus 56. This timing interval again is sufficiently long so that any expected second harmonic currents flowing in the distribution circuit 1 due to a reduction and re-establishment of the line voltage, will terminate and the timing network 44 will not be actuated.

Although the invention has been described with reference to a single certain specific embodiment thereof, numerous modifications are possible and it is desired to cover all modifications falling within the spirit and scope of the invention.

What is claimed and is desired to be secured by United States Letters Patent is as follows:

1. A relaying system for an electrical network comprising a pair of terminals adapted to be energized as a function of the frequency components of the current in said network, a first timing network having an input circuit and an output circuit and means for actuating its said output circuit solely after its said input circuit has been actuated for a predetermined time interval, a filter network interconnecting said terminals and said input circuit, said filter network being effective to pass solely current of a narrow frequency band, disabling means for rendering said timing network ineffective to time out its said time interval, a second timing network connected to said disabling means and being effective to disable said first timing network to prevent the timing out of said first timing network as a consequence of the energization of said terminals with a current in said frequency band until the timing out of said second timing network.

2. The combination of claim 1 in which the frequency passed by said filter network is the second harmonic frequency of the current supplied to said terminals, and in which said second timing network is arranged to time out as a consequence of an increase in the voltage applied to the network with which said system is associated.

3. A relaying system for opening a circuit interrupter to deenergize the conductors which supply an electrical feeder network from an electrical supply network in response to the faulting of one of the conductors comprising, an apparatus having a plurality of input terminals connected to said conductors at a portion of said feeder network spaced from said circuit interrupter by an intermediate feeder network portion, said apparatus including means responsive to the deenergization of said spaced portion because of a faulting of one of the conductors of said intermediate portion for initiating a flow of second harmonic current in said supply network, a second harmonic current flow detection apparatus having input connections and output connections, said detection apparatus being operable to establish an output quantity at its said output connections in response to the occurrence of a second harmonic quantity at its said input connections, means connecting said input terminals of said detection apparatus to said system for responding to the flow of current to said feeder network from said supply network, and means interconnecting said output connections of said detection apparatus and said disconnecting device, said last-named means being responsive to the occurrence of said output quantity for actuating said detection device to disconnect said feeder network from said supply network.

4. A relaying system for sensing open conductors in a polyphase electrical system having feeder buses and at least one polyphase branch network supplied from the feeder buses through a circuit interrupting device comprising, a polyphase inductive device having a core magnetically coupling together a polyphase primary winding and a polyphase secondary winding, means connecting said primary winding in Y connection to said branch network at a position spaced from said interrupting device by the section of said branch network which is to be protected, an asymmetric current conducting device, means connecting said secondary winding in delta and including said asymmetric device, and means for actuating said interrupting device to disconnect said branch network from said feeder buses, said means being operatively connented to said system and operable in response to the flow of second harmonic current in said branch network to actuate said interrupting device.

5. The combination of claim 4 in which said means includes a time delay device to interpose a predetermined time delay between the occurrence of said second harmonic current and the actuating of said interrupting device.

6. In an electrical energy distribution system having main feeder buses and at least one distribution circuit connected to said buses through a current interrupting device operable to disconnect said circuit from said buses in response to the application thereto of an electrical quantity, said circuit including a plurality of conductors connected at one end portion to said device for energization from said buses and a plurality of output transformers interconnecting said conductors with energy consuming devices; a second harmonic generator having terminals connected to the end portion of said conductors spaced from said one end portion by the portion of said conductors which is to be protected, said generator having the property of causing a second harmonic current to flow when one of said conductors ceases to energize said generator, control circuit means connected to respond to the current flowing through said generator and responsive solely to the second harmonic band of current, said control circuit means having an output circuit connected to said interrupting device and energized with said electrical quantity as a consequence of the existence of a second harmonic in said current flowing through said network one end portion, and a timing network responsive to the energization of said distribution circuit for preventing the actuation of interrupting device by said current sensitive network for a desired time interval subsequent to the energization of said distribution circuit.

7. In an electrical energy distribution system having main feeder buses and at least one distribution circuit connected to said buses through a current interrupting device operable to disconnect said circuit from said buses in response to the application thereto of an electrical quantity, said circuit including a plurality of conductors connected at one end portion to said device for energization from said buses and a plurality of output transformers interconnecting said conductors with energy consuming devices; a second harmonic generator having terminals connected to the end portion of said conductors spaced from said one end portion by the portion of said conductors which is to be protected, said generator having the property of causing a second harmonic current to flow when one of said conductors ceases to energize said generator, control circuit means connected to respond to the current flowing through said generator and responsive solely to the second harmonic band of current, said control circuit means having an output circuit connected to said interrupting device and energized with said electrical quantity as a consequence of the existence of a second harmonic in said current flowing through said network one end portion, a first timing network responsive to the energization of said distribution circuit for preventing the actuation of interrupting device by said current sensitive network for a desired time interval subsequent to the energization of said distribution circuit, and a second timing network for delaying the application of said electrical quantity to said current interrupting device for a predetermined time interval subsequent to the termination of said desired time interval.

8. In an electrical energy distribution system having main feeder buses and at least one distribution circuit connected to said buses through a current interrupting device operable to disconnect said circuit from said buses in response to the application thereto of an electrical quantity, said circuit including a plurality of conductors connected at one end portion to said device for energization from said buses and a plurality of output transformers interconnecting said conductors with energy consuming devices; a second harmonic generator having terminals connected to the end portion of said conductors spaced from said one end portion by the portion of said conductors which is to be protected, said generator having the property of causing a second harmonic current to flow through said one end portion of said conductors when one of said conductors ceases to energize said generator, control circuit means connected to respond to the current flowing through said one end portion of said conductors and responsive solely to the second harmonic band of current, said control circuit means having an output circuit connected to said interrupting device and energized with said electrical quantity as a consequence of the existence of a second harmonic in said current flowing through said network one end portion, and a timing network responsive to the last to occur of two operating conditions, for preventing the actuation of said interrupting device by said current sensitive network for a desired time interval subsequent to the termination of said condition, said first condition being the termination of a reduced voltage supplied to said one end portion of said conductors, said second condition being the energization of said distribution circuit.

9. A second harmonic producing device comprising, apparatus connected for energization from at least a pair of the phases of a polyphase supply for developing a zero sequence current as a consequence of an unbalanced condition of said polyphase supply, asymmetric current conducting means, and means connecting said asymmetric means to said apparatus for flow of said zero sequence current therethrough.

10. A second harmonic producing device comprising, a device having a Y connected polyphase winding and a delta connected polyphase winding inductively coupled to said Y connected winding, and an asymmetric current conducting device connected in series in said delta connected winding.

11. A second harmonic producing device comprising, a polyphase transformer having first and second polyphase windings inductively coupled together through a core structure, means connecting said first windings in Y formation, an asymmetric current conducting apparatus, and means including said apparatus connecting said second winding in delta.

12. A second harmonic producing device comprising a polyphase transformer array having first and second polyphase winding means, means connecting said first winding means in Y connection, an asymmetric current conducting apparatus, and means including said apparatus connecting said second winding means in delta connection.

13. A relaying device for use on an electrical distribution system having a distribution circuit comprising a plurality of conductors interconnecting one terminal portion to a first terminal portion, said first terminal portion being connected through a circuit breaker to polyphase energy supplying buses, said breaker being effective to connect and disconnect said first terminal portion to the buses comprising, apparatus connected to all of said plurality of conductors at said one terminal portions, said apparatus including means for developing zero sequence current solely in response to an interruption in the energization of said apparatus due to the deenergization of at least one of said conductors, said apparatus further including asymmetric means through which said zero sequence current flows whereby a second harmonic current is caused to flow through said breaker into said first terminal portion, a second harmonic sensing network connected to said distribution system adjacent said breaker, a breaker trip unit operatively connected to said breaker for actuation thereof to disconnect said distribution circuit from said buses, and means connecting said trip unit to said sensing network, said sensing network being operable to render said trip unit effective to actuate said breaker in response to the occurrence of a flow of a second harmonic current through said breaker.

14. The combination of claim 13 in which said means which connects said trip unit to said sensing network includes a timing unit to delay the actuation of said trip unit until said second harmonic current has existed for a desired time interval.

15. The combination of claim 14 in which a delay means responsive to an operating condition of said system is connected to said timing unit for preventing the timing out of said delay provided by said timing unit for a predetermined time interval subsequent to the termination of said system operating condition.

16. The combination of claim 15 in which said delay means prevents the timing out of said delay provided by said timing unit for a predetermined time interval subsequent to the connection of said distribution circuit to said buses by said breaker.

17. The combination of claim 13 in which said means which connects said trip unit to said sensing network includes means to delay the actuation of said trip unit for a desired time interval subsequent to the connection of said distribution circuit to said buses by said breaker.

18. A relaying device responsive to the existence of a broken conductor in a multi-conductor distribution circuit energized from three phase power distribution system through a circuit breaker having auxiliary control contacts which close and open as the breaker connects and disconnects the distribution circuit to and from the buses comprising, a group of current transformers connected to measure the current flowing through the breaker to the distribution circuit, a mutual reactor having a core with an air gap and primary and secondary windings, said primary winding being connected to receive current from said group of transformers, a network having input connections connected to said secondary winding of said reactor and output connections, said network being tuned to block the flow of current of the fundamental frequency between its said connections and to pass current of the second harmonic frequency, a relay apparatus having input connections connected to said output connections of said network and output connections and potential supplying connections, a first timing device having input connections connected to said output connections of said relay, a second timing device having input connections connected to a source of electrical energy through said auxiliary contacts of said breaker and output connections, circuit means connected to said output connections of said second timing device and to said potential supplying connections and effective as a consequence of the timing out of said second timing device to energize said potential supplying connections whereby said first timing device is prevented from timing out its timing interval until said second timing device has timed out its timing interval, means actuated as a consequence of the timing out of said interval of said first timing device for actuating said breaker to disconnect said distribution circuit from said buses, a three phase inductive device having polyphase primary and secondary windings magnetically interlinked by a magnetic core, said primary winding being connected in Y to the conductors of said distribution circuit with the common connection of said Y connected to ground, and a rectifier, said secondary winding being connected in delta through said rectifier.

19. The combination of claim 18 in which there is provided a positive sequence voltage filter connected to said buses, a relay having normally open contacts connected to said positive sequence filter, said relay being effective to close its contacts when the output of said filter is above a predetermined minimum critical value, and said normally open contacts being in series circuit with said auxiliary contacts of said breaker.

20. A relaying system for an electric network comprising a pair of input terminals adapted to be energized by the current in said network with an electrical quantity having at least first and second frequency components, an electric filter effective to pass solely a narrow-band of frequencies substantially at said second frequency, a first timing device having a first start mechanism for initiating a first timing interval, a switching device having an actuator and a switch, a network connecting said actuator to said input terminals and including said filter and said timing device, said network further including circuit means connecting said timing device to said filter whereby said timing device is effective to actuate said actuator to change the condition of said switch from an initial condition to an actuated condition solely when a frequency component within said narrow frequency band is supplied to said filter, a second timing device having a second start mechanism for initiating an actuation thereof from an initial to a timed out condition to determine a timing interval and having a reset mechanism for resetting itself to its said initial condition, means connecting said second timing device to said first timing device, said second timing device being effective prior to attaining its said timed out condition to render said first timing device ineffective to time its said first interval, second circuit means connected to said second start mechanism and reset mechanism, said second circuit means including said switch, said second circuit means being effective to actuate said second start mechanism to start the timing out of said second interval solely when said switch is in its said initial condition and being effective to actuate said reset mechanism to reset said second timing device as a consequence of the actuation of said switch to its said actuated condition.

21. The combination of claim 20 in which there is provided a conductor of said electrical network, a frequency responsive device having an input circuit operatively connected to said conductor and an output circuit connected to said pair of input terminals, said frequency responsive device being effective to energize said input terminals with said first and second frequencies in accordance with the presence or absence of said first and second frequencies in the current flowing in said conductor.

22. The combination of claim 21 in which said electrical network is a polyphase network, a positive sequence voltage network has an input connected to said polyphase network for energization as a function of the polyphase voltage therein, said sequence network having an output operatively connected to said second timing device, said sequence network being effective when the magnitude of the positive sequence voltage in said polyphase network is below a critical value to actuate said second timing device out of its said timed out condition.

23. The combination of claim 20 in which said electrical network is a polyphase network, a positive sequence voltage network has an input adapted to be energized from said polyphase network for energization as a function of the polyphase voltage therein, said sequence network having an output operatively connected to said second timing device, said sequence network being effective when the magnitude of the positive sequence voltage supplied to said sequence network is below a critical value to actuate said second timing device out of its said timed out condition.

References Cited

UNITED STATES PATENTS

| | | | |
|---|---|---|---|
| 2,357,995 | 9/1944 | Blomberg et al. | 340—310 |
| 2,394,089 | 2/1946 | McConnell | 317—47 X |
| 2,745,991 | 5/1956 | Seymour | 340—310 X |
| 2,997,631 | 8/1961 | Mookler | 317—147 |
| 3,072,827 | 1/1963 | Benish | 317—53 X |
| 3,160,787 | 12/1964 | Sonnemann | 317—27 X |
| 3,214,641 | 10/1965 | Sonnemann | 317—36 |
| 3,218,516 | 12/1965 | Sharp | 317—53 X |
| 3,223,889 | 12/1965 | Schweitzer | 317—53 X |
| 3,275,889 | 9/1966 | Sharp et al. | 317—53 |

FOREIGN PATENTS

| | | |
|---|---|---|
| 358,083 | 9/1931 | Great Britain. |

MILTON O. HIRSHFIELD, *Primary Examiner.*

R. V. LUPO, *Assistant Examiner.*